July 30, 1940.  J. ROBINSON  2,209,350
INTERCHANGE DEVICE FOR AUTOMATIC TRAIN PIPE CONNECTORS
Filed Jan. 21, 1939
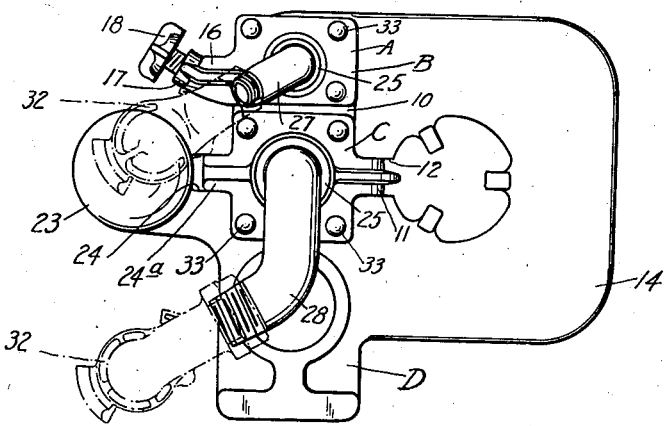
Fig. 1.
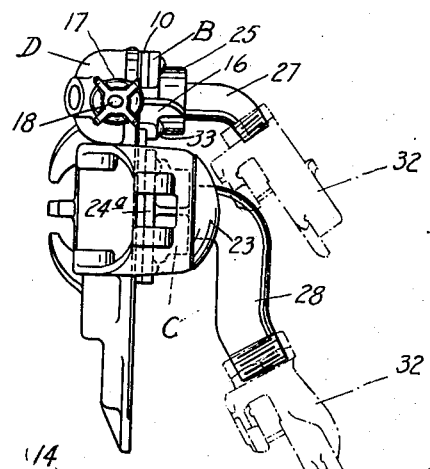
Fig. 2.
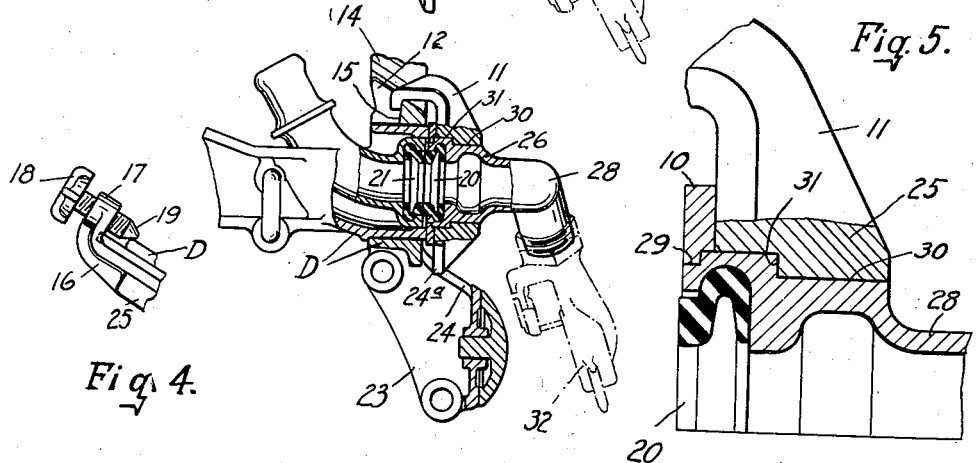
Fig. 4.
Fig. 3.
Fig. 5.
INVENTOR
JOSEPH ROBINSON
BY Robb & Robb
ATTORNEY Patented July 30, 1940

2,209,350

UNITED STATES PATENT OFFICE 2,209,350

INTERCHANGE DEVICE FOR AUTOMATIC TRAIN PIPE CONNECTORS

Joseph Robinson, New York, N. Y.

Application January 21, 1939, Serial No. 252,060

2 Claims. (Cl. 285—57)

This invention relates to automatic train pipe connectors for railway cars, and particularly to interchange devices for coupling a connector equipped car into interchange communication with a non-connector equipped car. Among the objects is to provide a "block assembly" type of interchange for one or more of the ports of these connectors which is clamped across the face of the connector head and pivotally carries hand operated couplings of the traditional type. The pivotal connection of these dummies to the interchange block facilitates making the interchange connection and eliminates strains on the hose, and kinks therein, under excessive longitudinal and lateral movement of the car couplers.

In the accompanying drawing, in which like reference characters indicate similar parts, Figure 1 is the front elevation of a connector head provided with my improved interchange device;

Figure 2 is a side view thereof;

Figure 3 is a sectional plan view showing the pivotal connection of the conventional couplings to the interchange block A, and showing also how the block interlocks with the coupling head;

Figure 4 is a detail plan view of the adjustable lock for clamping the interchange to the connector head, and Figure 5 is a detail sectional view of the pivotal bearing for the fittings 24—25.

My improvement, though usable with any type of connector head, is here illustrated in association with a ball and funnel coupling head of the type shown in my co-pending application Serial #245,057, filed December 12, 1938. The invention includes a block A which comprises the plate 10 and the bearings or housings B and C, each of which is securely anchored to the plate. The housing C includes a laterally and rearwardly extending hook 11 which passes through an opening 12 on the inner side of the funnel 14 of the connector head D and hooks over, or interlocks with, the surface 15 formed behind the front face of the head and adjacent the opening 12. The housing B includes an angularly disposed lug 16 which extends rearwardly of the front face of the connector head and is provided with a bearing 17 in which an anchor screw 18 is threaded. The screw has a tapered inner end 19 adapted to engage the head D to draw the interchange tightly against the face of the head and compress the mating gaskets 20—21, Figure 3. To assure accurate alignment of the gaskets in my improved interchange with the gaskets in the connector head, I slot the forwardly extending ball member or guide 23 as at 24 to receive the laterally extending positioning guide or finger 24ª formed on the housing C diametrically opposite of the hook 11. Engagement of this finger in the slot 24, and engagement of the hook 11 with the surface 15 of the connector head D, accurately positions my improved interchange on the head with its ports properly aligned with the ports in the head.

Each housing B and C is provided with an interior bearing identical in construction, except that the bearing in housing C is somewhat larger than the bearing in housing B. Each bearing includes a shank 25 of considerable length in which the enlarged gasket carrying end 26 of the curved fittings 27—28 pivotally bears. This enlarged end of each fitting is reduced in diameter at 29 to pass through an opening in the plate 10 and to form a shoulder which bears against the plate, and is reduced in diameter at 30 to bear against a complementary shoulder 31 in the bearing. The arrangement is such that when the plate 10 is riveted to the housings, the fittings 27—28 are anchored in their bearings against longitudinal movement but are free to pivot therein. The gasket 20 is of the expansible or balloon type, and is mounted in an interior annular groove in the enlarged end of each fitting, as shown in Figures 3 and 5. When my improved interchange is anchored to the connector head the pressure of the fluid carried enters the grooves of mating gaskets and drives the faces of the gaskets toward each other thus augmenting the joint formed by clamping my improved interchange against the face of the connector heads. The conventional hand hose couplings 32 are threaded to the lower end of the fittings 27—28 after the fittings have been assembled in their respective bearings in the housings B and C and the plate 10 has been firmly secured to the housings as by the rivets 33. The fitting 28 is curved to clear the ball member 23 when rotated vertically in its bearing, and the fitting 27 is proportioned and curved so that its coupling 32 clears the fitting 28. The shape of these fittings is an important feature of my improvement inasmuch as the conventional couplings 32 must rest in a predetermined place in order to be easily coupled into companion couplings of non-connector equipped cars and permit adequate longitudinal and lateral movement of the hose of the unequipped car without kinking or unduly straining such hose. My improvement is simple, compact and of adequate strength to withstand the hard usages to which such devices are subjected. I am aware, of course, that the gaskets 20 may be eliminated and the desired joint secured by clamping the front face of the head 26 of the fittings against the gaskets 21 in the connector head, but a more dependable joint is secured from the construction shown.

What I claim is:

1. An interchange device for automatic train pipe connectors, comprising in combination a plate, a pair of housings anchored to said plate, each of said housings having a bearing, a pair of curved fittings each of which is provided with an enlarged end that is pivotally mounted in one of said bearings and is anchored therein by said plate, oppositely arranged laterally extending lugs formed on one of said housings and adapted to project into openings in the guiding members of the connector head to position the interchange on the head, one of said lugs being hooked over a bearing formed on said head, an adjustable lock for clamping said plate and said housings to the connector head, said lock including a rearwardly extending lug integral with one of said housings, a clamp mounted on said lug and adapted to engage the connector head, and a conventional hand operated hose coupling mounted on each of said fittings.

2. An interchange device for an automatic train pipe connector, comprising in combination, a coupling head having a substantially flat vertically arranged face disposed at approximately a right angle to the longitudinal direction of the connector and adapted to make a butt-joint, said coupling head having a centrally arranged port on opposite sides of which horizontally arranged openings are provided to receive the positioning lugs of an interchange device that is normally completely detached from said head, said coupling head being also provided with a forwardly extending guiding member in which one of said openings is located and with a rearwardly extending guiding member in which another of said openings is located, an interchange device normally detached from said coupling head and normally carried separately thereof, said device including a housing having oppositely arranged lugs which extend into said openings to removably position the interchange on said head, one of said lugs being provided with means adapted to interlock with said head when the interchange device is in the service position only, a base formed separately of the housing and to which the housing is secured, a fitting extending forwardly out of said housing and curving downwardly and laterally with respect thereto, said fitting being pivotally mounted in said housing and being provided with a conventional hand operated hose coupling, the fitting being shaped to carry said hose coupling past the front end of said forwardly extending guiding member when the fitting is rotated upwardly in the housing, an expansible gasket mounted in the end of said fitting and adapted to mate with a gasket in said coupling head, and means for drawing said interchange device tightly against said head to compress said gaskets.

JOSEPH ROBINSON.